Figure 1:
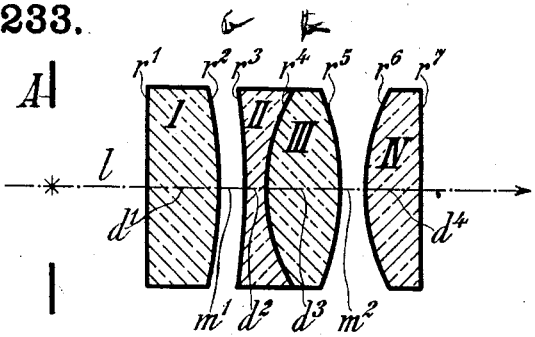

A. KÖNIG.
OCULAR.
APPLICATION FILED JUNE 25, 1915.

1,159,233.

Patented Nov. 2, 1915.

Inventor
Albert König

UNITED STATES PATENT OFFICE.

ALBERT KÖNIG, OF JENA, GERMANY, ASSIGNOR TO FIRM OF CARL ZEISS, OF JENA, GERMANY.

OCULAR.

1,159,233.  Specification of Letters Patent.  Patented Nov. 2, 1915.

Application filed June 25, 1915. Serial No. 36,250.

*To all whom it may concern:*

Be it known that I, ALBERT KÖNIG, a citizen of the German Empire, residing at Jena, Germany, have invented a new and useful Ocular, of which the following is a specification.

The invention relates to oculars composed of two lens-groups, the relative distance of which is less than a quarter of the total focal length of the ocular. One of the said groups may be embodied in a simple lens.

The invention deals more particularly with oculars, the lens-groups of which consist of lenses, which are either all cemented together or in which, so far as they are not cemented, the surfaces facing each other form pairs of surfaces, the power (the sum of the powers of the two surfaces) of which does not amount to more than a fifth of the total power of the ocular, so that such pairs of surfaces may be taken as pairs of surfaces which are equivalent to a cemented surface. A pair of surfaces cemented together and a pair of surfaces equivalent in the just described sense to a pair of surfaces cemented together both may be called hereinafter a "compound-surface-pair." Several such oculars have become known, they have, however, the disadvantage that they are either not sufficiently free from astigmatism for fairly large field of vision or are too expensive to manufacture on account of strong curvatures.

In the case of the new ocular these disadvantages are avoided, this being effected by observing the following conditions. In the first place the focal length of the group of lenses, which is nearer the eye, amounts to from one third to two thirds of the focal length of the other group, in the second place in each group the radius of curvature of the surface facing the other group is no greater than two thirds of the radius of the outer surface, and in the third place the strongest dispersive cemented compound-surface-pair turns the concave side of both surfaces toward the eye.

If the strongest dispersive compound-surface-pair be placed into the lens-group, which is remote from the eye, the special advantage is obtained that the entering angles of the principal rays do not become too great at this compound-surface-pair and that there is still sufficient over correcting effect for the elimination of distortion and astigmatism. If the said compound-surface-pair be in the lens group, which is nearest the eye, at the most only one of the said advantages is obtainable. Under certain circumstances it may suffice to give the ocular only a single compound-surface-pair.

In the annexed drawing four constructional examples of the ocular according to the invention are shown in section.

In all four examples the front focal plane is indicated by a field of vision diaphragm A. In each of the first three examples the lens-group, which is nearest the eye, is a simple plano-convex lens. The lens-group remote from the eye consists in the first example (Figure 1) of three lenses, two of which are cemented together, while the surfaces, with which the two other lenses face one another, form a surface-pair, which is equivalent to a cemented surface. In the second example (Fig. 2) the said lens-group also consists of three lenses, all of which are, however, cemented together, while in the third example (Fig. 3) the said group contains only two lenses, which are cemented together. In the fourth example (Fig. 4) each of the two lens-groups is formed by a pair of lenses cemented together. The radii, distances and thicknesses of the four examples are given below, in each case relating to a total focal length of the ocular equal to 100. The kinds of glass used are in each case indicated by the refractive index $n_D$ for the line D of the solar spectrum.

*1st Example, Fig. 1.*

| Radii. | Distances and thicknesses. |
|---|---|
| $r^1 = \infty$ | $l = 39$ |
| $r^2 = -177$ | $d^1 = 30$ |
| $r^3 = -282.4$ | $m^1 = 10$ |
| $r^4 = +79.8$ | $d^2 = 9$ |
| $r^5 = -104.2$ | $d^3 = 30$ |
| $r^6 = +88.5$ | $m^2 = 10$ |
| $r^7 = \infty$ | $d^4 = 23$ |

*Kinds of glass.*

| Lens: | I | II | III | IV |
|---|---|---|---|---|
| $n_D =$ | 1,516 | 1,648 | 1,510 | 1,573 |

Figure 2:
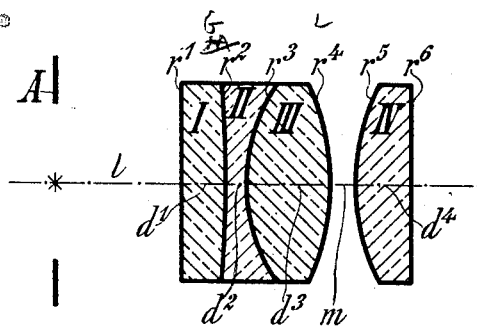

*2nd Example, Fig. 2.*

| Radii. | Distances and thicknesses. |
|---|---|
| $r^1 = \infty$ | $l = 51$ |
| $r^2 = -520.3$ | $d^1 = 18$ |
| $r^3 = +72$ | $d^2 = 9$ |
| $r^4 = -97.3$ | $d^3 = 34$ |
| $r^5 = +89$ | $m = 10$ |
| $r^6 = \infty$ | $d^4 = 23$ |

*Kinds of glass.*

| Lens: | I | II | III | IV |
|---|---|---|---|---|
| $n_D =$ | 1,516 | 1,648 | 1,516 | 1,573 |

Figure 3:
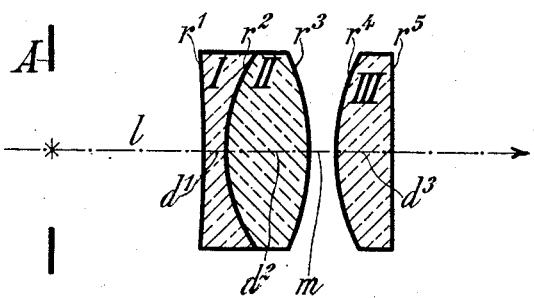

*3rd Example, Fig. 3.*

| Radii. | Distances and thicknesses. |
|---|---|
| $r^1 = -1652.3$ | $l = 62$ |
| $r^2 = +71.8$ | $d^1 = 9$ |
| $r^3 = -97.1$ | $d^2 = 34$ |
| $r^4 = +88$ | $m = 10$ |
| $r^5 = \infty$ | $d^3 = 23$ |

*Kinds of glass.*

| Lens: | I | II | III |
|---|---|---|---|
| $n_D =$ | 1,648 | 1,516 | 1,573 |

Figure 4:
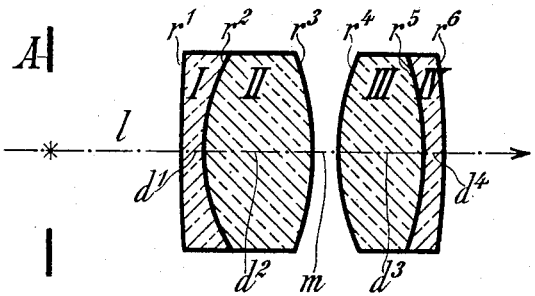

*4th Example, Fig. 4.*

| Radii. | Distances and thicknesses. |
|---|---|
| $r^1 = +659.9$ | $l = 53.1$ |
| $r^2 = +78.4$ | $d^1 = 8.9$ |
| $r^3 = -114.5$ | $d^2 = 44.3$ |
| $r^4 = +99.1$ | $m = 10.6$ |
| $r^5 = -119.8$ | $d^3 = 35.4$ |
| $r^6 = -294.2$ | $d^4 = 8$ |

*Kinds of glass.*

| Lens: | I | II | III | IV |
|---|---|---|---|---|
| $n_D =$ | 1,648 | 1,516 | 1,516 | 1,573 |

I claim:

1. An ocular consisting of two lens-groups, one of which groups comprises more than one lens and the relative distance of which is less than a quarter of the total focal length of the ocular, in both groups all lenses-surfaces, facing each other, forming a compound-surface-pair, the focal length of the group nearer the eye being one third to two thirds of the focal length of the other, in either group the radius of curvature of the surface facing the other group being no greater than two thirds of the radius of the outside surface and the strongest dispersive compound-surface-pair turning the concave side of both surfaces toward the eye.

2. An ocular consisting of two lens-groups, one of which groups comprises more than one lens and the relative distance of which is less than a quarter of the total focal length of the ocular, in both groups all lenses-surfaces, facing each other, forming a compound-surface-pair, the focal length of the group nearer the eye being one third to two thirds of the focal length of the other, in either group the radius of curvature of the surface facing the other group being no greater than two thirds of the radius of the outside surface and the strongest dispersive compound-surface-pair turning the concave side of both surfaces toward the eye, which compound-surface-pair is contained in the group remote from the eye.

3. An ocular consisting of two lens-groups, of which groups the group remote from the eye contains a single compound-surface-pair turning the concave side of both surfaces toward the eye, while the other group is embodied in a single lens and its focal length is one third to two thirds of the focal length of the first named group, the relative distance of which groups is less than a quarter of the total focal length of the ocular, in either group the radius of curvature of the surface facing the other group being no greater than two thirds of the radius of the outside surface.

ALBERT KÖNIG.